J. A. SWINEHART.
TIRE CORD AND METHOD OF MAKING SAME.
APPLICATION FILED MAY 14, 1918.

1,437,870. Patented Dec. 5, 1922.

Inventor
James A. Swinehart.

Fisher and Moser
Attorney.

Patented Dec. 5, 1922.

1,437,870

UNITED STATES PATENT OFFICE.

JAMES A. SWINEHART, OF AKRON, OHIO.

TIRE CORD AND METHOD OF MAKING SAME.

Application filed May 14, 1918. Serial No. 234,419.

*To all whom it may concern:*

Be it known that I, JAMES A. SWINEHART, a citizen of the United States of America, residing at Akron, in the county of Summit and State of Ohio, have invented certain new and useful Improvements in Tire Cords and Methods of Making Same, of which the following is a specification.

My invention relates to an improved tire cord and method of making the same.

Heretofore a frictioned or rubber-coated fabric has been made comprising a series of parallel threads of fine twisted strands, a few light cross-threads being preferably woven at intervals in the fabric. This fabric is then divided into strips and the strands twisted spirally into a round tire cord.

The object of my invention is to provide a tire cord or cord like member formed from the herein before mentioned fabric or from regularly woven tire fabric in which the longitudinally extending strands will retain their parallelism as distinguished from twisted strands.

Figure 1:
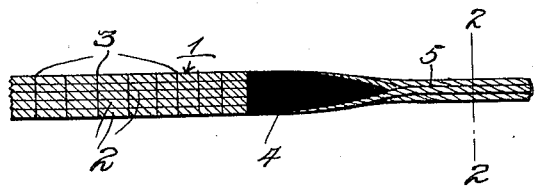
Figure 1 is a plan view of a strip of fabric partly broken away showing a portion thereof rolled to form my improved tire cord.
Figure 3:
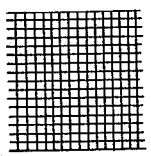
Figure 3 is a plan view of a sheet or strip of regularly woven tire fabric.

In practice I take a strip of fabric 1 as illustrated in Figure 1, or the regularly woven fabric of Figure 3 formed of longitudinally extending parallel threads or warp 2 of fine twisted threads and cross threads or woof 3. The threads or woof 3 (Figure 1) are comparatively light and are arranged at intervals and in Figure 3 the warp and woof is equally spaced and of same size. Both fabrics are coated on one side with a layer of soft rubber 4. The reverse side of the fabric may or may not be covered with a relatively lighter coating of rubber. The fabric 1 is preferably made in wide sheet form from which strips may be readily severed but may be made in the form of relatively narrow strips as illustrated in the drawings, which will when rolled produce a tire cord of the desired diameter.

Figure 2:
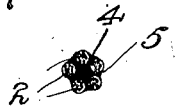
Figure 2 is a section on the line 2—2 of Figure 1.

The strip of fabric 1 is folded longitudinally as at 5, but of course throughout the entire length of the strip. That is to say, the narrow strip is folded into a circle as shown in Fig. 2 by bringing thread 2 at one edge into parallel engagement with the thread 2 at the opposite edge of the strip. Then this folded product is rolled to round it and compactly compress the rubber core and cause the threads to adhere to each other through the rubber which squeezes out between the threads as it is rolled, making a homogeneous tire cord the threads or warp 2 of which all lie in a parallel plane one to the other and at right angles to the light cross-threads or woof 3.

In tire formation it is necessary to contract the fabric at the inner circumference of the tire and to stretch or widen out the same at its outer circumference or periphery. I have found that this desideratum or necessity is obtained by rolling the threads or warp 2 into cord formation to a greater degree than where the fabric is twisted thus distorting the threads to spiral shape or form.

While I have found that I can employ the conventional regularly woven fabric (Figure 3) to good advantage when the latter is folded or rolled according to my method as distinguished from the twisting operation or step hereinbefore mentioned much better results are obtained from the use of the fabric illustrated in Figure 1.

Having thus described my invention, what I claim is:

1. A tire cord comprising a strip of fabric of parallel rubber-coated threads formed in a circle parallel to each other and to the longitudinal axis of the cord.

2. A tire cord comprising a strip of fabric of fine twisted rubber coated threads formed in a circle, the threads being parallel to each other and to the longitudinal axis of the cord and the rubber coating rolled together within the circle.

3. A round tire cord comprising a single circle of rubber coated threads, each thread being fine and twisted and extending longitudinally on straight lines parallel with the other threads and the longitudinal axis of the cord, the combined rubber coating for all the threads forming a cushioning roll within the circle.

4. A method of producing a tire cord comprising the step of rolling a predetermined number of parallel strands of fine twisted threads and a facing of rubber into a circle with the rubber on the inside of the circle and with the threads parallel to each other and to the longitudinal axis of the cord.

5. A tire cord comprising a strip of fabric made of fine twisted warp threads and fine twisted woof threads, the woof threads being spaced apart a greater distance than the warp threads, and faced on one side with a layer of rubber and formed into a circle with the warp threads on straight parallel lines to each other and to the longitudinal axis of the cord and with the woof threads encircling the rubber.

6. A method of producing a round tire cord consisting in the step of rolling a narrow strip of tire fabric and a layer of rubber into a circle and with the opposite longitudinal edges of the strip in contiguous parallel uniting relation parallel to the longitudinal axis of the cord and with the rubber rolled together in binding union on the inside thereof.

7. A tire cord comprising a circle of a plural number of twisted threads of fibrous material extending on straight parallel lines with each other and to the longitudinal axis of the cord and surrounding a central binding and cushioning core of rubber.

In testimony whereof I affix my signature in presence of two witnesses.

JAMES A. SWINEHART.

Witnesses:
EDNA JAMES SHEEHY,
KATHRINE L. MILLS.